United States Patent
Albert et al.

(10) Patent No.: US 6,626,390 B2
(45) Date of Patent: Sep. 30, 2003

(54) CORD WINDER

(75) Inventors: Wilma Albert, Wülfershausen (DE); Elmar Freund, Rödelmaier (DE); Martin Jessenberger, Eussenhausen (DE); Herbert Kess, Bad Neustadt (DE); Andreas Schlereth, Bad Neustadt (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/173,418

(22) Filed: Jun. 17, 2002

(65) Prior Publication Data
US 2003/0038201 A1 Feb. 27, 2003

Related U.S. Application Data

(63) Continuation of application No. PCT/EP00/12296, filed on Dec. 6, 2000.

(30) Foreign Application Priority Data

Dec. 17, 1999 (DE) .......................... 199 61 115

(51) Int. Cl.[7] ............................... B65H 75/48
(52) U.S. Cl. ................ 242/385.2; 191/12.2 R
(58) Field of Search .................. 242/385.2, 385.1, 242/385.3, 381; 191/12.2 R, 12.2 A, 12.4

(56) References Cited

U.S. PATENT DOCUMENTS

| | | | | |
|---|---|---|---|---|
| 4,391,421 A | * | 7/1983 | Naitoh et al. | 242/385.2 |
| 4,651,947 A | * | 3/1987 | Tsukamoto | 242/385.2 |
| 4,856,728 A | * | 8/1989 | Schmidt et al. | 242/385.2 |

FOREIGN PATENT DOCUMENTS

| | | |
|---|---|---|
| DE | 33 16 977 A1 | 11/1984 |
| DE | 85 20 923.6 U1 | 10/1985 |
| DE | 37 21 044 A1 | 1/1989 |
| DE | 88 03 133.0 U1 | 8/1989 |
| JP | 05 261 044 A | 10/1993 |
| JP | 06 000 153 A | 1/1994 |
| JP | 07 155 277 A | 6/1995 |

OTHER PUBLICATIONS

Anonymous: "Electrical–cord winder with remote control", *Research Disclosure*, Aug. 1997, p. 495, XP–000726620.

* cited by examiner

Primary Examiner—John M Jillions
(74) Attorney, Agent, or Firm—Laurence A. Greenberg; Werner H. Stemer; Gregory L. Mayback

(57) ABSTRACT

A cable winding device for an electrical unit, in particular, for a vacuum cleaner, is described. The cable winding device has a cable drum, rotatably mounted on a fixed support piece, with a locking element. After the release of the locking element the cable drum may be driven in the winding-in direction by a drive. The release of the locking element occurs by an electrically-operated release mechanism.

4 Claims, 1 Drawing Sheet

CORD WINDER

CROSS-REFERENCE TO RELATED APPLICATION

This application is a continuation of copending International Application No. PCT/EP00/12296, filed Dec. 6, 2000, which designated the United States and was not published in English.

BACKGROUND OF THE INVENTION

Field of the Invention

The invention relates to a cord winder for an electrical appliance, in particular a vacuum cleaner. The cord winder has a cord drum, disposed rotatably on a fixed support part, that is provided with a blocking element after whose release the cord drum is drivable in the winding direction by a drive device.

One such cord winder is known from German Utility Model DE 88 03 133 U, or Published, Non-Prosecuted German Patent Application DE 33 16 977 A. In the cord winder known from DE 88 03 133 U, a sliding-block disk is provided as the blocking element on the cord drum and cooperates with a blocking pin. The sliding-block disk is configured such that after the cord has been drawn off from the cord drum, in the winding motion then accomplished by the drive device of the cord drum the blocking pin digs into the contour of the sliding-block disk, thus preventing further rotary motion in the winding direction. Releasing the blockage in the winding direction is accomplished by pulling on the cord again. The slight resultant rotary motion of the cord drum in the unwinding direction reverses the digging-in of the blocking pin into the sliding-block disk, so that after the end of the pulling motion, the cord drum can be driven in the winding direction by the drive device. The winding process must accordingly be initiated by pulling on the cord again.

In the cord winder known from Published, Non-Prosecuted Patent Application DE 33 16 977 A, a wrap spring is disposed on a hub extension of the cord drum and in the relaxed state rests firmly on the outer circumference of the hub extension. By one end, the wrap spring is fixed to a stationary housing part of the cord winder. The other end of the wrap spring is coupled to a release element. Via the release element, which is actuatable from the outside of a vacuum cleaner housing by a release button, the other end of the wrap spring can be swiveled in the direction of increasing its diameter. Because of the increase in diameter, the braking action of the wrap spring is undone, and the drive device can drive the cord drum in the winding direction. The release button has to be kept pressed down during the entire winding operation, since if the button is let go, the braking action of the wrap spring immediately ensues again.

SUMMARY OF THE INVENTION

It is accordingly an object of the invention to provide a cord winder that overcomes the above-mentioned disadvantages of the prior art devices of this general type, in which the winding up of the cord can be accomplished without a separate actuating action that has to be performed by the user of the appliance.

With the foregoing and other objects in view there is provided, in accordance with the invention, a cord winder for an electrical appliance. The cord winder contains a fixed supporting part and a cord drum disposed rotatably on the fixed supporting part and has a releasable blocking element being a sliding-block brake and a drive device. After a release of the sliding-block brake the cord drum is drivable by the drive device in a winding direction. An electrically triggerable unlocking device releasably locks the sliding-block brake. The electrically triggerable unlocking device has an intermediate gear wheel, an electromagnet and a spring tensed by the electromagnet and kept in a tensed position by the electromagnet. The electromagnet has a magnet core. A ring gear is disposed on the cord drum and is drivingly connected to the intermediate gear wheel. A rack is connected to the magnet core of the electromagnet. The rack has teeth meshing with the intermediate gear wheel and the rack in turn is drivingly connected to the ring gear in an unwinding direction of the cord drum and which freewheels relative to the cord drum in the winding direction.

The stated object is attained in accordance with the invention in that the-release of the blocking element is done by an electrically trippable unlocking device. The unlocking device that accomplishes the release of the blocking element can be activated either by an active electrical control pulse or by switching off the electrical voltage. The operation of winding up the cord can thus be initiated in a simple way.

Because the unlocking device has a spring, which can be tensed by an electromagnet and is kept in its tensed position by the electromagnet, the winding operation is initiated without further action upon shutoff of the appliance or when the plug is unplugged, since with the absence of voltage the electromagnet loses its holding force, and the spring previously kept in the tensed state now completes the release of the blocking element.

A structurally simple embodiment is obtained by providing that the electromagnet has a linearly movably disposed magnet core, by whose attraction motion a tension or compression spring can be tensed, and that coupled with the magnet core is an actuating member which acts directly or indirectly on the blocking element. The adjusting motion occurring upon relaxation of the tension or compression spring after the shutoff of the electromagnet is utilized to release the blocking element. Thus the user of the appliance need not perform any special unlocking of the blocking element.

In a cord winder in which the cord drum is provided with a sliding-block brake, the unlocking of the cord drum in the winding direction is attained by connecting a rack to the magnet core of the electromagnet. The teeth of the rack mesh with the intermediate gear wheel, which in turn is drivingly connected, in the unwinding direction of the cord drum, to a ring gear provided on the cord drum, and which freewheels relative to the cord drum in the winding direction.

Because an electrically acting driving part is provided that acts on the blocking element in the release direction, it is possible to perform winding up of the cord during use of the appliance, that is, when an electrical voltage is being applied. To that end, the electrically acting driving part is connected to a voltage, thereby releasing the blocking element from its blocking position and thus releasing the cord drum for the winding motion. Thus a partial winding up of the cord during use of the appliance is possible, for instance if the length of cord pulled out is in the way while working with the appliance.

Other features which are considered as characteristic for the invention are set forth in the appended claims.

Although the invention is illustrated and described herein as embodied in a cord winder, it is nevertheless not intended to be limited to the details shown, since various modifications and structural changes may be made therein withoutdeparting from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
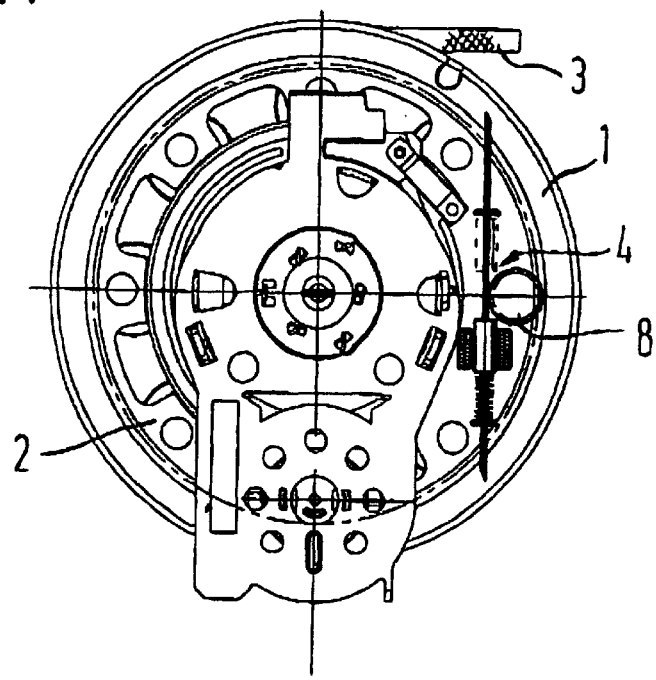
FIG. 1 is a diagrammatic, side-elevational view of a cord winder with an attached unlocking device for releasing a cord drum brake according to the invention.

Referring now to the figures of the drawing in detail and first, particularly, to FIG. 1 thereof, there is shown a cord drum 1, which is supported rotatably on a fixed part 2 and onto which a cord 3 can be wound and from which it can be unwound. The cord drum 1 is provided for instance with a non-illustrated sliding-block brake.

One such sliding-block brake is known from German Utility Model DE 85 20 923 U and includes a cable winding device with a cable drum which is disposed in rotating fashion at a stationary bearing part and which can be driven in the winding direction by means of a drive device upon releasing a blocking element. In order to achieve releasing of the blocking element by means of the tractive force exerted on the cable, there are two circular guide slots realized on the exterior of a sidewall of the cable drum concentric to the rotational axis thereof, into which a radially movable blocking pin which is disposed on the bearing part engages under the influence of force. The blocking pin is led into the first guide slot during unwinding and into the second guide slot during winding. A V-shaped transition slot is provided at least at one position in the perimeter of the guide slots with its vertex pointing in the direction of rotation corresponding to unwinding. The vertex forms a stop for the blocking pin the outer leg of the V, which points from the first guide slot to the vertex of the transition slot, is formed of a guide edge which is provided on the base of the guide slot as an axial shoulder, and the inner leg of the V-shaped transition slot, which points from the inner vertex to the second guide slot, is realized as a guide rail. At a second position in the perimeter, another transition slot is provided between the two guide slots, through which the blocking pin is guided from the second guide slot into the first for unwinding. There is an additional guide edge, which is formed by an axial shoulder, provided on the base of the second guide slot as an extension of the guiding sidewall of this additional transition slot. In accordance with the mode of operation of such a sliding-block brake, the braking action is undone by rotating the cord drum slightly in the unwinding direction, so that the cord drum 1 can then be driven in the winding direction by the drive device provided, and the cord 3 can be wound up. The rotation of the cord drum 1 required to undo the braking action is effected by an unlocking device attached to the fixed part.

The unlocking device 4 has an electromagnet, which contains an electrically excitable magnet coil 5 and a magnet core 6. A compression spring 7 is coupled to the linearly adjustable magnet core 6 and when the electromagnet is switched on the spring 7 is compressed, that is, tensed, by the attraction motion of the magnet core 6 and is kept in the tensed position as long as the electromagnet is on. Instead of a compression spring, a tension spring coupled accordingly to the magnet core 6 can be provided.

Figure 2:
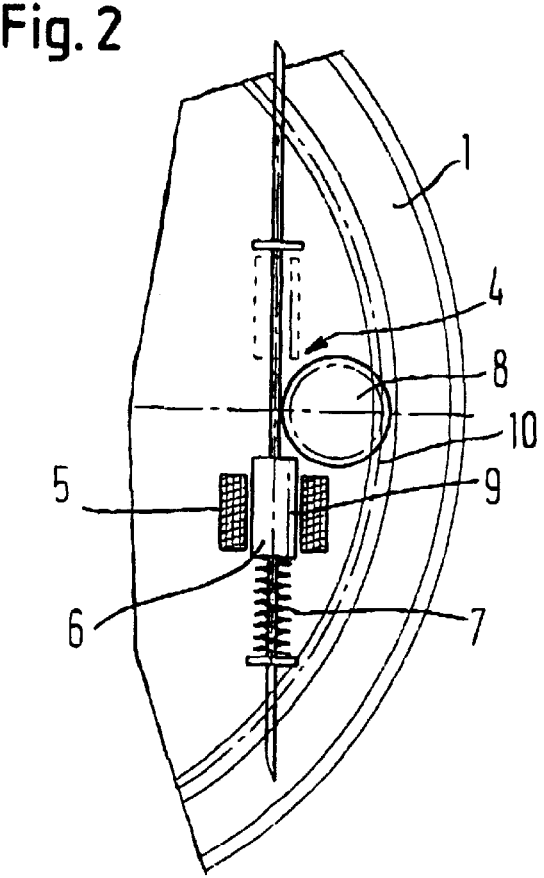
FIG. 2 is a partial, detailed, side-elevational view of the unlocking device that releases the cord drum brake.

The unlocking device 4 further includes an intermediate gear wheel 8. The latter can be driven via a rack 9 coupled to the magnet core 6. In the exemplary embodiment, the rack 9 is embodied directly on the magnet core 6. The intermediate gear wheel 8 is also drivingly connected to a ring gear 10 disposed on the cord drum 1 (FIG. 2). The drive device 11 is configured such that the cord drum 1 is drivable via the intermediate gear wheel 8 only in the unwinding direction; conversely, in the winding direction of the cord drum 1, freewheeling occurs between the cord drum 1 and the intermediate gear wheel 8.

The unlocking device 4 functions as follows. When an electrical voltage is applied to the magnet coil 5, the magnet core 6 is attracted, thus tensing the compression spring 7. The application of the voltage can be done synchronously with the switching on of the electrical appliance with which the cord winder is associated, or by simply plugging in the plug. While the appliance is being used, the cord 3 wound onto the cord drum 1 can be pulled out from the cord drum 1 as needed. The sliding-block brake provided on the cord drum 1 prevents an immediate re-winding up of the cord 3. If the appliance is shut off or the plug is unplugged when someone finishes using the appliance, the electromagnet becomes voltageless at the same time, and thus the holding force exerted by the magnet core 6 on the compression spring 7 is undone. The compression spring 7 now pushes the magnet core 6 out of the magnet coil 5. In this process, the rack 9 comes to mesh with the intermediate gear wheel 8. As a result, the intermediate gear wheel 8 is driven clockwise. The driving motion is transmitted from the intermediate gear wheel 8 to the ring gear 10 of the cord drum 1, which is thus rotated slightly in the clockwise direction. The direction of the rotary motion thus corresponds to the rotary motion that occurs as the cord 3 is drawn from the cord drum 1. As already explained above, undoing the braking position of the sliding-block brake is attained by a slight rotary motion of the cord drum 1 in the unwinding direction. Thus because the compression spring 7 is released upon shutoff of the electromagnet, the braking position of the sliding-block brake is undone, and the winding operation is thus initiated. The winding operation is accomplished by the drive device (for instance a spring motor) provided on the cord winder.

When the electromagnet is switched on again, the magnet core 6 is attracted by the magnetic field of the magnet coil 5 and again tenses the compression spring 7. In the adjusting motion of the magnet core 6 again, the rack 9 comes to mesh with the intermediate gear wheel 8. The intermediate gear wheel 8 is thus rotated counterclockwise. Since in this rotary direction freewheeling occurs between the intermediate gear wheel 8 and the ring gear 10 of the cord drum 1, this rotary motion has no influence whatever on the cord drum 1. Not until the electromagnet is shut off and the compression spring 7 again executes an adjusting motion is the cord drum 1 again rotated slightly in the unwinding direction, thus as already explained undoing the braking action of the sliding-block brake.

By the unlocking device 4, however, a braking device known from Published, Non-Prosecuted German Patent Application DE 33 16 977 A can also be released from its braking position. In that case, the adjusting motion affected by the compression spring 7 upon shutoff of the electromagnet is transmitted to the other end of the wrap spring, provided as a braking element, whose braking action is thus undone. Since the compression spring 7 acts constantly on the other end of the wrap spring, the winding operation can be performed unimpaired.

The unlocking device 4 described is also suitable for tripping a winding operation during use of the appliance. An electrically acting driving part, defined by the rack 9 and the magnet core 6, is provided that acts on the blocking element (sliding-block brake) in the release direction, which makes it possible to perform winding up of the cord 3 during use of the appliance, that is, when an electrical voltage is being applied. To that end, the electrically acting driving part is connected to a voltage, thereby releasing the blocking element from its blocking position and thus releasing the cord drum 1 for the winding motion. Thus a partial winding up of the cord 3 during use of the appliance is possible. To that end, the electromagnet can for instance be switched intentionally to be without voltage, thus unding the braking action of the respective cord drum brake, and the cord 3 is wound up. By switching the electromagnet back on again, the cord drum brake is then activated again, and the winding operation is discontinued.

We claim:

1. A cord winder for an electrical appliance, the cord winder comprising:

a fixed supporting part;

a cord drum disposed rotatably on said fixed supporting part and having a releasable blocking element being a sliding-block brake and a drive device, after a release of said sliding-block brake said cord drum being drivable by said drive device in a winding direction;

an electrically triggerable unlocking device releasably locking said sliding-block brake, said electrically triggerable unlocking device having an intermediate gear wheel, an electromagnet and a spring tensed by said electromagnet and kept in a tensed position by said electromagnet, said electromagnet having a magnet core;

a ring gear disposed on said cord drum and drivingly connected to said intermediate gear wheel; and a rack connected to said magnet core of said electromagnet, said rack having teeth meshing with said intermediate gear wheel and said rack in turn is drivingly connected to said ring gear in an unwinding direction of said cord drum and which freewheels relative to said cord drum in the winding direction.

2. The cord winder according to claim 1, wherein:

said magnet core of said electromagnet is disposed linearly movably; and said spring is selected from the group consisting of tension springs and compression springs that can be tensed by an attraction motion of said magnet core.

3. The cord winder according to claim 1, further comprising an electrically operative driving part acting on said sliding-block element in a release direction.

4. In a vacuum cleaner, a cord winder, comprising:

a fixed supporting part;

a cord drum disposed rotatably on said fixed supporting part and having a releasable blocking element being a sliding-block brake and a drive device, after a release of said sliding-block brake said cord drum being drivable by said drive device in a winding direction;

an electrically triggerable unlocking device releasably locking said sliding-block brake, said electrically triggerable unlocking device having an intermediate gear wheel, an electromagnet and a spring tensed by said electromagnet and kept in a tensed position by said electromagnet, said electromagnet having a magnet core;

a ring gear disposed on said cord drum and drivingly connected to said intermediate gear wheel; and a rack connected to said magnet core of said electromagnet, said rack having teeth meshing with said intermediate gear wheel and said rack in turn is drivingly connected to said ring gear in an unwinding direction of said cord drum and which freewheels relative to said cord drum in the winding direction.

* * * * *